Sept. 12, 1944.　　　G. W. BORKLAND　　　2,357,806
METHOD OF MAKING CUPPED FORMATIONS OF THERMO PLASTIC SHEET MATERIAL
Filed Oct. 2, 1941　　　2 Sheets-Sheet 2

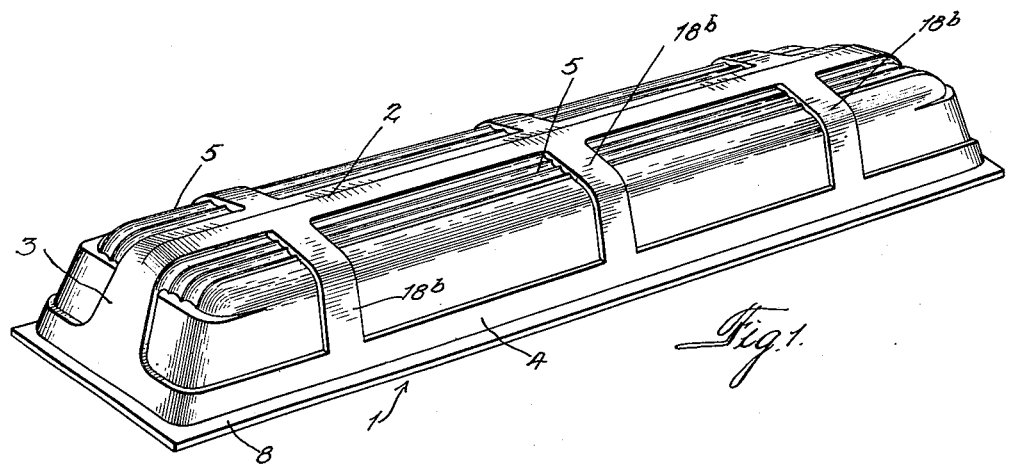
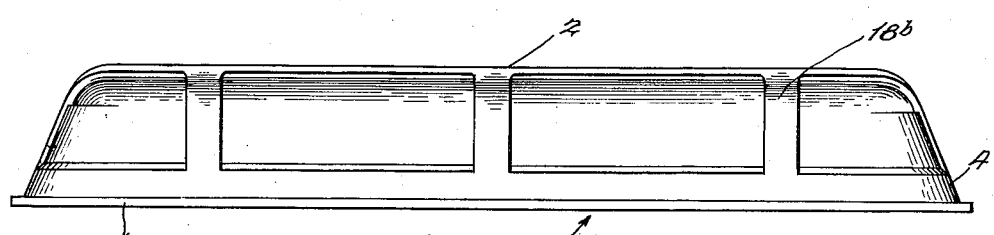
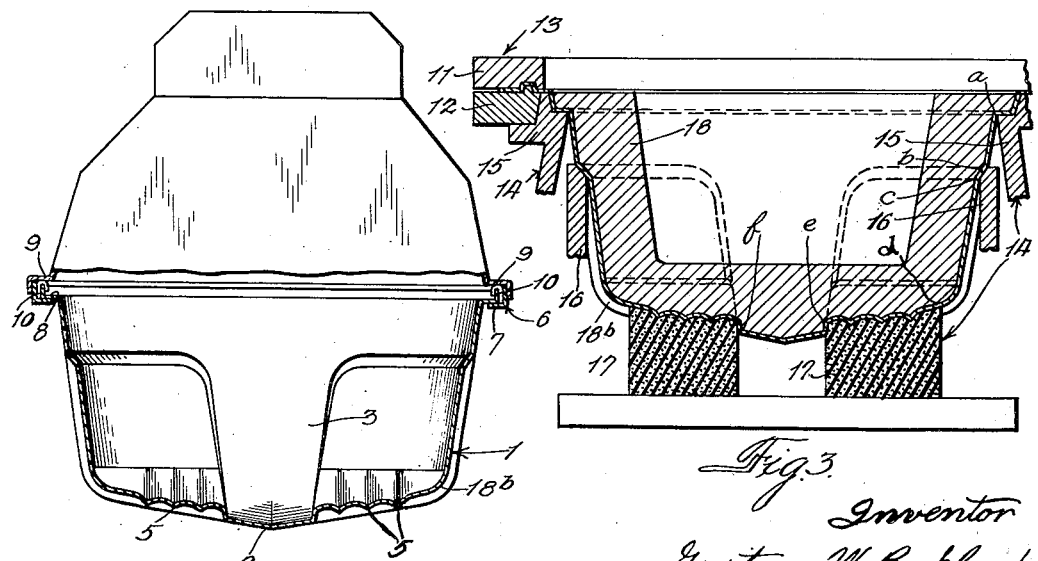

Inventor:
Gustave W. Borkland.
By Thiess, Olson & Mecklenburger
Attys.

Patented Sept. 12, 1944

2,357,806

UNITED STATES PATENT OFFICE 2,357,806

METHOD OF MAKING CUPPED FORMATIONS OF THERMOPLASTIC SHEET MATERIAL

Gustave W. Borkland, Chicago, Ill.

Application October 2, 1941, Serial No. 413,314

1 Claim. (Cl. 18—56)

My invention relates to cupped formations of thermoplastic sheet material.

One of the objects of my invention is to provide a cupped formation made of thermoplastic, thin, sheet material pressed or drawn while heated to plasticity by means of a forming die.

Further objects and advantages of the invention will appear from the description and claim.

In the drawings, in which an embodiment of my invention is shown,

Figure 1 is a bottom-up perspective view of a trough-like light-transmitting shield;

Fig. 2 is a side view of the shield;

Fig. 3 is a transverse sectional view of the shield and forming die;

Fig. 4 is an end view showing the shield in section attached to a reflector;

Figure 5:
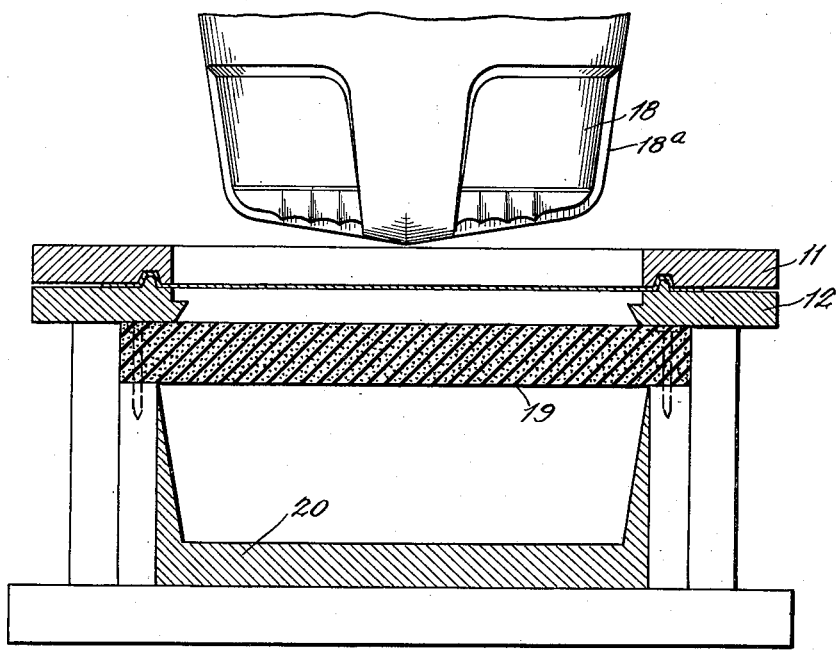
Fig. 5 is a vertical transverse sectional view showing another form of apparatus for forming the shield.

Referring to the drawings in detail, the construction shown comprises a lighting shield I formed from a transparent or translucent thin sheet of thermoplastic material pressed or drawn while heated to plasticity into a forming die. Any suitable thermoplastic material may be used, such as cellulose acetate, ethyl cellulose, or acrylic resin, or the like. These sheets may be formed of material as thin as .002" in thickness. Due to the thinness of the material, the light absorption is relatively small. The shields themselves are very light and may be so shaped and designed that the concave shields may be nested one inside the other very compactly for shipping. The material when formed and set is somewhat flexible, but the design is such that it is amply reinforced by ribs, corrugations, and curves so as to maintain its shape. Shapes of the design shown can be readily pressed into a forming die provided the depth of the draw does not exceed twice the opening. When the warmed or heated sheet is forced into the mold, contact with the die cools the sheet material, causing it to set and hold its shape, following the contour of the forming die. The shield is so constructed that it is spaced from the electric light, thus diffusing the light and reducing the brightness without too great a light loss in transmission.

The shield is shown as applied to an inverted trough-like reflector, in which may be mounted any suitable light source, such as an elongated fluorescent bulb. The trough-like shield has a medial stiffening rib 2 extending longitudinally of the bottom of the trough-like member and thence upwardly along the ends at 3, and also has a stiffening rib 4 extending along the sides and ends of the trough-like member adjacent the upper edges thereof. The medial stiffening rib is united at its ends to the rib extending around the sides and ends. Additional corrugations 5 may be provided extending longitudinally of the shield to further stiffen it.

The shield may be secured to the reflector by means of a rectangular frame 6, L-shaped in cross section, on the inwardly extending flange 7 of which the outwardly extending flange 8 of the shield rests and to which it is secured by means of clips 9 secured to the vertical leg of the angle frame and bent down over the upwardly extending flange 10 of the shield.

In making the shield, a thin flat sheet is clamped firmly between the clamping sections 11 and 12 of a rectangular frame 13 and heated to render it sufficiently plastic for forming. The frame 13 carrying the heated sheet is placed in position on a sectional forming die 14. The forming die 18 is then brought down gradually onto the sheet, stretching the heated plastic sheet over and between the sections 15, 16 and 17 of the die 14. It will be noted that between the points $a$ and $b$, the points $c$ and $d$, and the points $e$ and $f$, there is no part of the die 14 for cooperation with the internal forming die 18. It is only where there is to be a re-entrant portion of the contour of the shield that a section of the die 14 is required. This skeleton formation of the die 14 enables the plastic sheet to slip with considerable freedom on the surface of the die 18 as this die descends. It thus enables a substantially uniform stretching of the sheet of heated plastic material, resulting in a substantially uniform thickness of the stretched sheet. The formed sheet cools and sets quickly after being formed, due to its contact with the forming dies.

If desired, the sections 17 may be of some material such as sponge rubber which will yield when the die 18 is brought down, causing portions of the sponge rubber sections 17 to enter into the corrugations on the die 18 to press the warm plastic sheet material into the forming corrugations. If desired, the die may be provided with forming embossments 18a to provide ribs 18b extending transversely between the longitudinal rib 2 and the longitudinal ribs 4.

Figure 6:
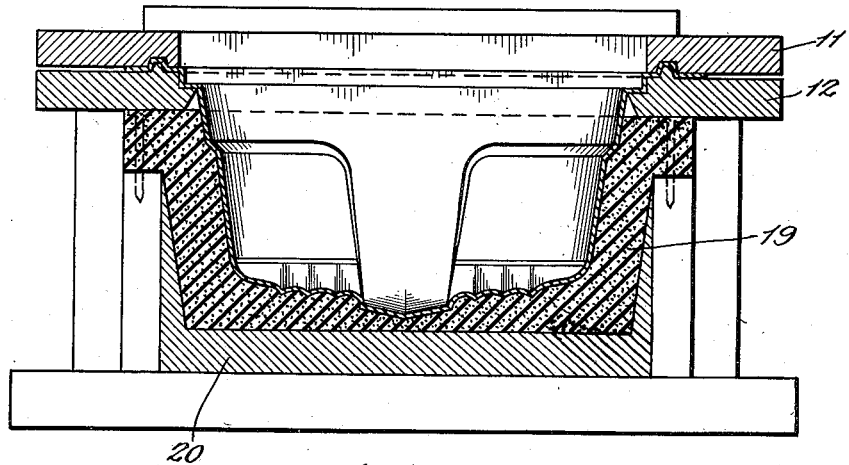
Fig. 6 is a view similar to Fig. 5 but showing the parts in different position.

In Figs. 5 and 6 the clamping sections 11 and 12 may be substantially the same as shown in Fig. 4. In Figs. 5 and 6, however, a comparatively thin sheet 19 of elastic yieldable material such as sponge rubber is stretched across the opening in the frame through which the forming die 18 enters. A suitable backing or support 20 for this rubber sheet is provided so that when the die 18 is in its lowermost position, as shown in Fig. 6, this backing will support the sponge rubber sheet and cause portions of the sponge rubber to firmly engage the thermoplastic sheet and force it snugly against the forming portions of the die.

The outside of the shield may be finished in a mat or pebbled finish, if desired, for diffusing the light and reducing the glare without great loss in light transmission. It is also possible, by means of colored sheets, to diffuse the light and give the desired color effect.

The color of light may be controlled either by applying a suitable translucent coloring material to the surface of the shield or by mixing into the ingredients of which the sheet is formed a pigment of a suitable color. It will also be seen that when the semiflexible shield is placed in position underneath the fluorescent tube it will form a protection against falling glass in the event of explosion of the tubes and will protect the tubes against breakage by impact. If desired, the thermoplastic sheet may be made light-diffusing by sandblasting or etching.

Further modifications will be apparent to those skilled in the art and it is desired, therefore, that the invention be limited only by the scope of the appended claim.

Having thus described my invention, what I claim and desire to secure by Letters Patent is:

A method of forming a thin flat thermoplastic sheet into a cupped formation having a bottom portion and outwardly-flaring side portions which comprises heating the sheet to render it sufficiently ductile to enable it to be stretched materially but not sufficiently to render it deformable by gravity, securing a marginal portion of the sheet surrounding the portion to be cupped against lateral slipping, applying unheated pressure-exerting means on said sheet transverse to the plane of the sheet on central portions of the sheet spaced laterally inwardly a substantial distance from said marginal portions to depress said central portions to form the bottom of the cupped formation and to stretch and draw the heated ductile sheet material lying between the marginally-secured portions and the pressure-receiving portions of the sheet to form the outwardly-flaring side portions of the cupped formation, the heating operation being prior to the drawing operation, the portions of the sheet lying between the marginally-secured portions and the pressure-receiving portions being out of contact with the pressure-exerting means during at least a substantial part of the said drawing and stretching operation.

GUSTAVE W. BORKLAND.